US007988171B2

(12) United States Patent
Chong

(10) Patent No.: US 7,988,171 B2
(45) Date of Patent: Aug. 2, 2011

(54) BI-FOLDING WHEELCHAIR

(75) Inventor: Edward Y. Chong, Spring Valley, CA (US)

(73) Assignee: Carlsbad International Export Co., Inc., Carlsbad, CA (US)

( * ) Notice: Subject to any disclaimer, the term of this patent is extended or adjusted under 35 U.S.C. 154(b) by 581 days.

(21) Appl. No.: 11/996,464

(22) PCT Filed: Jul. 20, 2006

(86) PCT No.: PCT/US2006/028388

§ 371 (c)(1),
(2), (4) Date: Jul. 14, 2008

(87) PCT Pub. No.: WO2007/014042

PCT Pub. Date: Feb. 1, 2007

(65) Prior Publication Data

US 2008/0265542 A1 Oct. 30, 2008

Related U.S. Application Data

(60) Provisional application No. 60/701,703, filed on Jul. 22, 2005.

(51) Int. Cl.
*B62M 1/14* (2006.01)

(52) U.S. Cl. .................................. 280/250.1; 280/304.1

(58) Field of Classification Search ............... 280/250.1, 280/304.1, 287, 42, 39, 649, 47.34, 650
See application file for complete search history.

(56) References Cited

U.S. PATENT DOCUMENTS

| | | | | |
|---|---|---|---|---|
| 4,493,488 | A * | 1/1985 | Panaia et al. | 280/42 |
| 4,989,890 | A * | 2/1991 | Lockard et al. | 280/42 |
| 5,253,886 | A * | 10/1993 | Weege | 280/39 |
| 5,328,183 | A * | 7/1994 | Counts | 280/42 |
| 5,358,263 | A * | 10/1994 | Aldus et al. | 280/42 |
| 5,496,050 | A * | 3/1996 | Geiger et al. | 280/250.1 |
| 5,857,688 | A * | 1/1999 | Swearingen | 280/250.1 |
| 5,915,709 | A * | 6/1999 | Radjenovic et al. | 280/250.1 |
| 6,302,429 | B1 * | 10/2001 | Friedrich | 280/649 |
| 6,352,275 | B1 * | 3/2002 | Lindenkamp | 280/250.1 |
| 6,834,871 | B2 * | 12/2004 | Chen et al. | 280/47.34 |
| 6,889,993 | B2 * | 5/2005 | Chen et al. | 280/287 |
| 6,938,911 | B1 * | 9/2005 | Shyu et al. | 280/250.1 |

* cited by examiner

*Primary Examiner* — Hau V Phan
(74) *Attorney, Agent, or Firm* — Richard D. Clarke

(57) ABSTRACT

The present invention is directed to a bi-folding wheelchair (10) with side frames (12) and (14) that fold together with a compound scissor action moving the large rear wheels (96) to a central location while the backrest (50) is folding downwardly. Two separate locking mechanisms (28) and (40) hold the frame apart in the upright position while two additional locking mechanisms (77) hold the backrest (50) upright or down in the collapsed position. All the major components of the conventional wheelchairs like the foot rests, the arm rests, large wheels, caster wheels and the backrest fit into a compact package narrower than the unfolded wheelchair and slightly larger than the diameter of the back wheels with all parts folding in and out simultaneously. The large rear wheel assemblies can be quickly removed further reducing the size and weight of the device for shipping or storage.

20 Claims, 7 Drawing Sheets

BI-FOLDING WHEELCHAIR

FIELD OF THE INVENTION

The present invention is directed to the new design and improved convenience of the folding wheelchairs presently used by the handicapped. The multiple folding capabilities and dismantling features that come together in this design create as compact and lightweight wheelchair as possible. The novelty of this device is that all the major components of the conventional wheelchairs like the feet rests, the arm rests, wheels and back rest all fit into a compact package narrower than the existing wheelchair and slightly larger than the diameter of the back wheels with all parts fold in and out simultaneously. The device is locked in four separate places in the upright position and two places in the compact position. It can easily be handled by an elderly adult.

BACKGROUND OF THE INVENTION

A significant number of the people are confined to move about in wheelchairs all or part of the time and face many challenges. While some of their problems are solved by the limited mobility afforded them through the wheelchair, other problems stem from the design, the weight and the amount of storage space required for conventional cumbersome wheelchairs.

This invention relates to portable wheelchairs capable of folding or collapsing that have been in use for many years to accommodate wheelchair users who travel and need to take their wheelchairs with them or store them in space limited compartments. Typically, the wheelchairs that are designed to fold or collapse incorporate a pair of diagonally extending cross members, secured between a right and left frame member which scissor together to collapse the wheelchair sides. Although increasing the portability of the wheelchair, the typical cross member frame sacrifices strength and stability. Additionally, standard cross member frame construction for portable wheelchairs is bulky and heavy, making transportation or storage difficult at best. Consequently, portable wheelchairs have not been designed for easy storage in standard luggage compartments on airlines, small to medium sized automobiles, trains and other forms of transportation.

Wheelchairs are generally designated as either "active" or "passive" depending upon how they are used. An active wheelchair is a wheelchair that is operated by the wheelchair user. Active wheelchairs generally have large rear wheels with a circular handgrip ring attached to the wheels. The wheelchair occupant propels the wheelchair himself by applying a force to the handgrip ring to turn the rear wheels.

On the other hand, a passive wheelchair is designed to be pushed by an individual to transport the wheelchair occupant sitting in the wheelchair. These passive wheelchairs generally have much smaller rear wheels than the active wheelchair and usually include a bar attached to the back seat of the wheelchair for the individual to grip while pushing the passive wheelchair.

SUMMARY OF THE INVENTION

This invention has the unique capability of folding in two separate directions at the same time with the foot rests attached and rotating to an internal position putting the device into a compact state. Additionally, the large rear wheel assemblies can be quickly removed to reduce the size and weight even further. Front and rear scissor over center locking mechanisms spread the device and lock it in the open position while a back rest locking mechanisms locks the back rest in an upright position along with locking it in the collapsed position. When locked in the collapsed position the wheelchair cannot be opened without releasing the backrest locking assembly release rings.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

OBJECTS OF THE INVENTION

The principal advantage of the invention is to produce a wheelchair that will fold in two separate directions into a compact state and is easy to handle.

Another advantage of the invention is to provide a compact bi-folding wheelchair that is sufficiently compact in design to enable its storage in standard luggage compartments in automobiles, airlines, trains and other means of transportation.

Another advantage of the invention is to produce a wheelchair that folds in two different directions with the foot rests attached, so that when folded it is only slightly larger than the diameter of the large rear wheels, having the handle bar grips extending for easy manipulation.

Another advantage of the invention is to produce a wheelchair with a front and back over center locking mechanism to hold the device in the open position.

Another advantage of the invention is to produce a wheelchair with two additional spring-loaded locking mechanisms to lock the backrest up in the open position and lock it down in the closed position.

Another advantage of the invention is to produce a wheelchair that in the extended or compact state is light enough for an elderly adult to handle.

And still another advantage is to create a wheelchair with the large rear wheel assemblies that are easily removable by the means of pressing a plunger in the center of the axle to release the spring-loaded ball detent holding the wheel assembly to the frame.

A further advantage of the invention is to produce a collapsible wheelchair that is substantial enough to comfortably support an average adult.

A final advantage of this invention is to add a new and unique bi-folding wheelchair to the area of medical devices used to assist the handicapped.

These together with other advantages of the invention, along with the various features of novelty, which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention. There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

BRIEF DESCRIPTION OF THE DRAWINGS

The accompanying drawings, which are incorporated in and form a part of this specification, illustrate certain embodiments of the invention and together with the description, serve to explain the principles of certain embodiments of this invention.

DETAILED DESCRIPTION OF THE PREFERRED EMBODIMENTS

Figure 1:
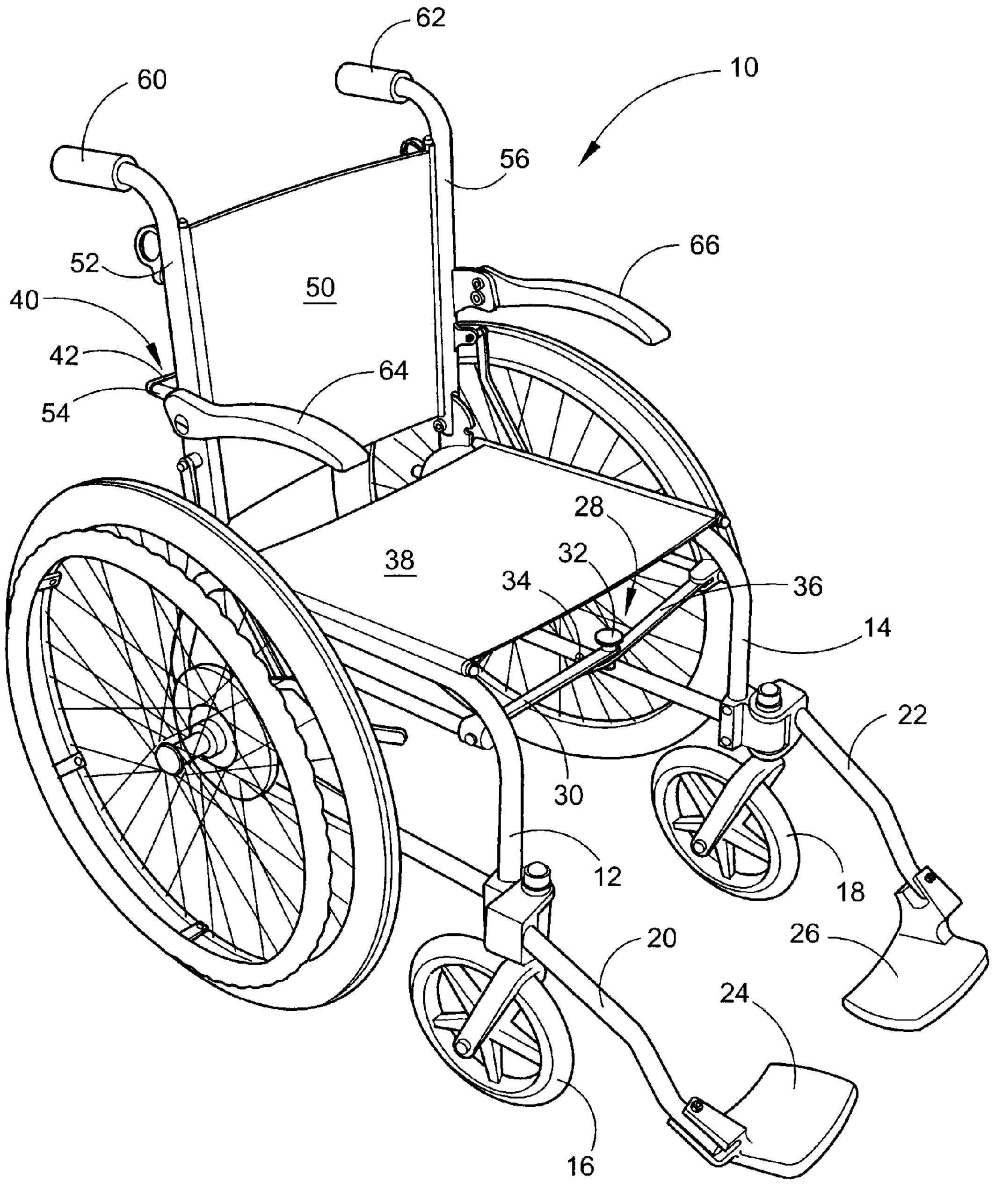
FIG. 1 depicts a front perspective view of the bi-folding wheelchair, constructed in accordance with the present invention.

Referring now to the drawings, wherein similar parts of the bi-folding wheelchair 10 are identified by like reference numerals, there is seen in FIG. 1 a front perspective view of the bi-folding wheelchair 10 in the upright position, consisting of a right side frame member 12 and a left side frame member 14. Attached to the front of the frame members 12 and 14 are conventional swivel casters 16 and 18. Foot support extensions 20 and 22 holding foot supports 24 and 26 attached above swivel casters 16 and 18 have the ability to swivel separately from the casters to extend out for the support of the feet or swivel back out of the way when they are not needed or when the device is in the compact state.

Figure 2:
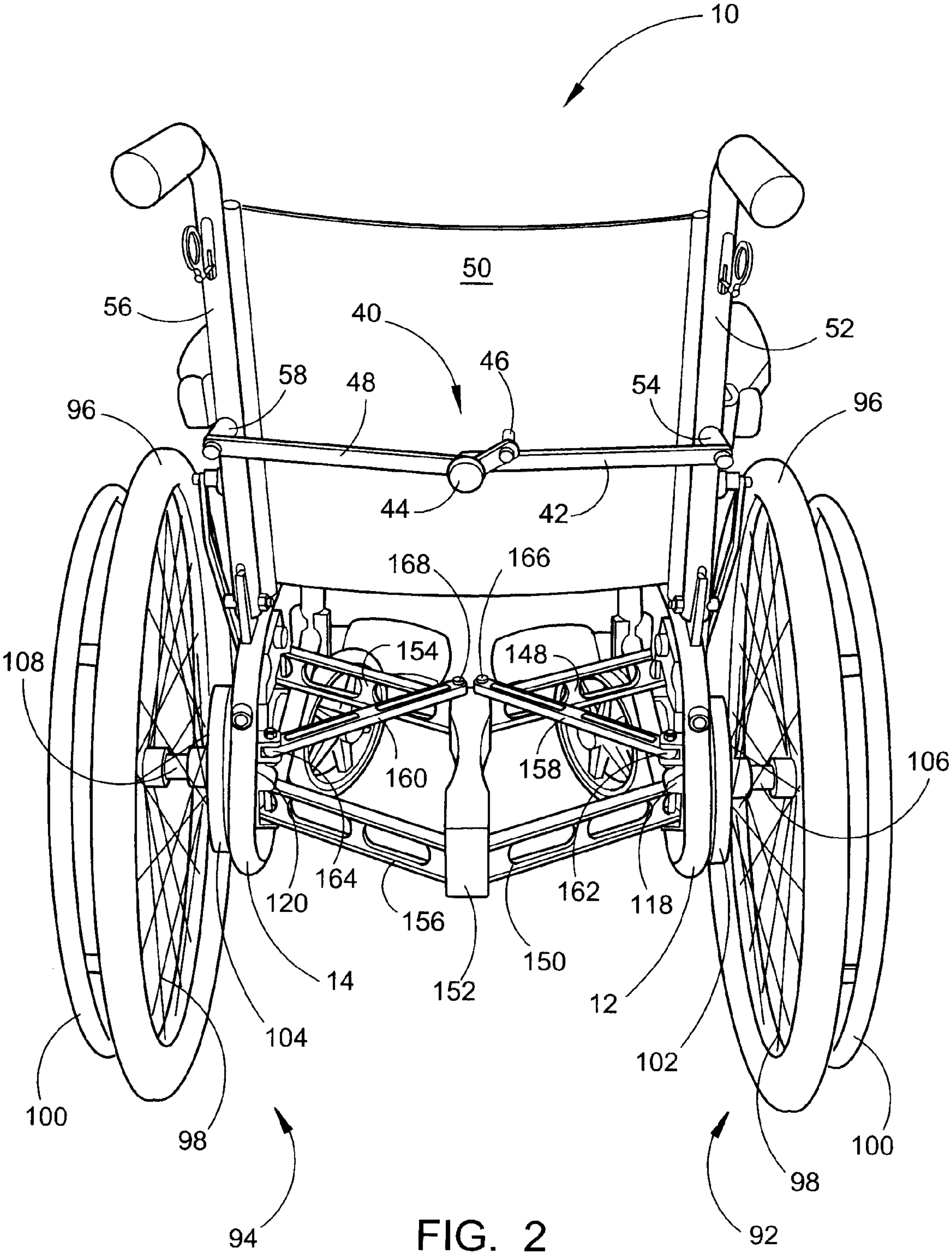
FIG. 2 depicts a rear perspective view of the bi-folding wheelchair, constructed in accordance with the present invention.

The right side frame member 12 and the left side frame member 14 are locked in the extended position by the front over center locking mechanism 28. This is accomplished by the means of the right side locking arm 30 with the hand knob 32 going past the center line position to be held in place by the stop pin 34 on the left side locking arm 36. The seat fabric 38 is stretched tightly when the front over center locking mechanism 28 is in the extended position. Additional support is achieved by the means of the back over center locking mechanism 40. The backrest fabric 50 is stretched tightly when the back over center locking mechanism 40 is in the extended position. The right side locking arm 42 is attached to the right back rest support bar 52 by the means of the stanchion 54 and the left side locking arm 48 shown in FIG. 2, is attached to the left back rest support bar 56 by the means of the stanchion 58. At the distal ends of the right and left backrest support bars 52 and 56 are the handgrips 60 and 62. Attached to the sides of the backrest support bars 52 and 56 are the armrests 64 and 66. The armrests 64 and 66 are pivotally attached to back rest support bars 52 and 56.

FIG. 2 depicting a rear perspective view of the bi-folding wheelchair 10 illustrates clearly the back over center locking mechanism 40 that operates in like manner to the front over center locking mechanism 28 where the right side locking arm 42 with the hand knob 44 goes past the center line position to be held in place by the stop pin 46 on the left side locking arm 48. The wheel assemblies 92 and 94 uses conventional wheels 96 and spokes 98 equipped with handgrip rings 100. The breaking disks 102 and 104 are attached to the inside of the wheel hubs 106 and 108. The lower folding capability of the bi-folding wheelchair 10 is facilitated by the means of a compound scissor action with the right front pivot arm 148 and the right rear pivot arm 150 connecting to the right sliding wheel and break mounting unit 118 and the center folding member 152. The left front pivot arm 154 and the left rear pivot arm 156 are connected to the left sliding wheel and break unit 120 and also attach to the center folding member 152. Actuating arms 158 and 160 by being fixably attached to frame members 12 and 14 at pivot points 162, 164, and on center folding member 152 at pivot points 166 and 168 exert pressure on the right and left sliding wheel and break unit 118 and 120 when the device is folded, moving the right and left wheel assemblies 92 and 94 forward to a more central location on the framework of the device.

Figure 3:
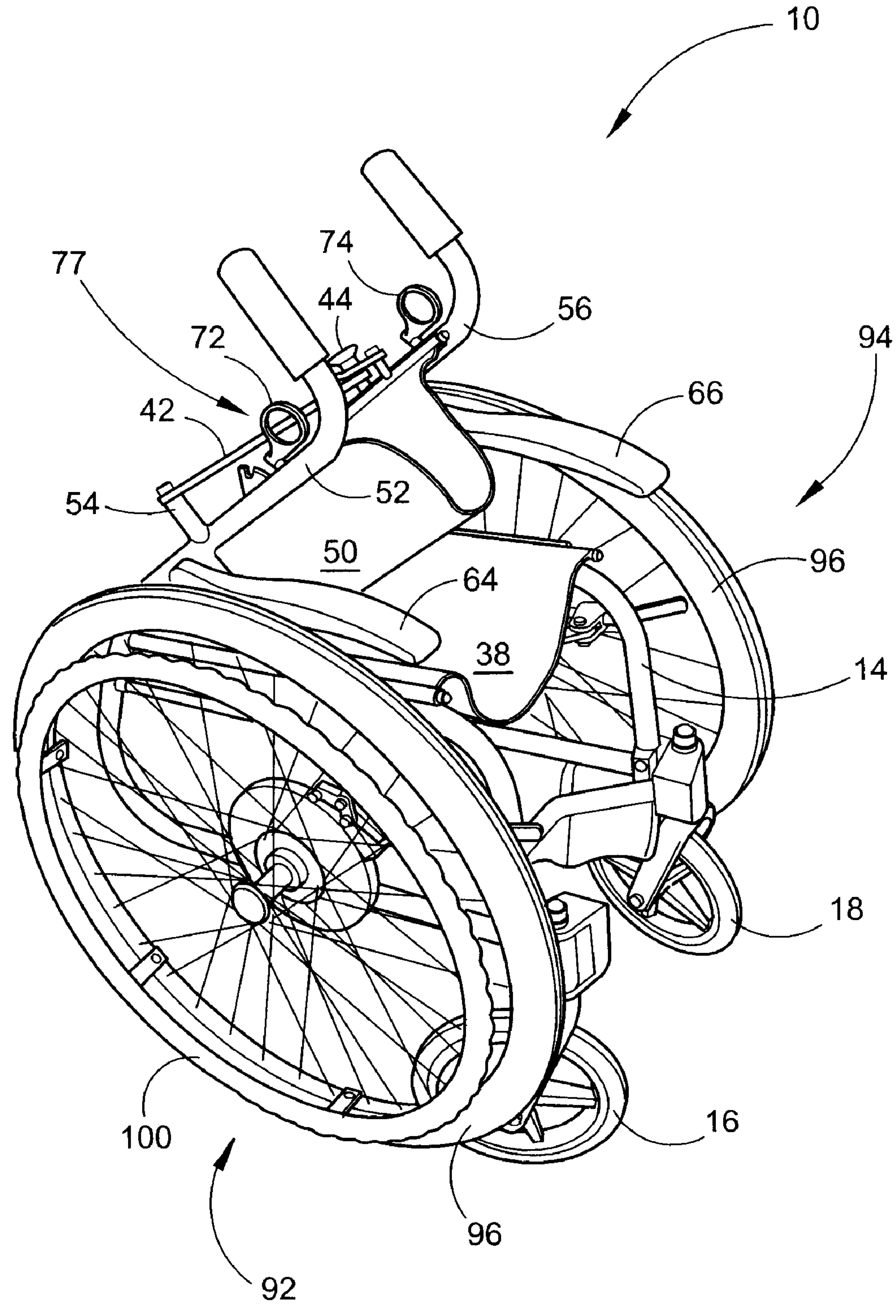
FIG. 3 depicts a side perspective view of a partially collapsed bi-folding wheelchair, constructed in accordance with the present invention.
Figure 4:
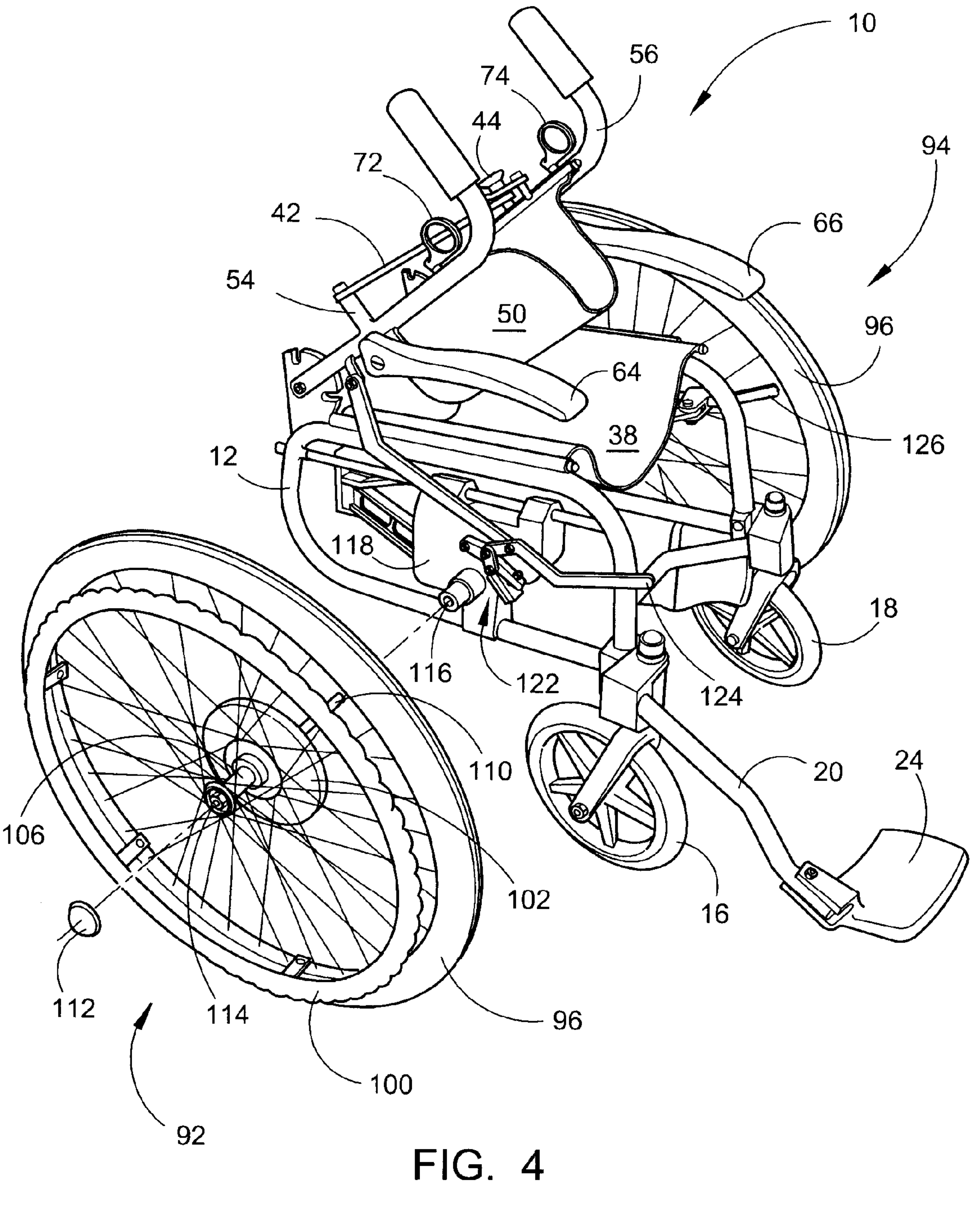
FIG. 4 depicts a side perspective view of a partially collapsed bi-folding wheelchair with one of the large rear wheels with the circular grip ring exploded away, constructed in accordance with the present invention.

FIG. 3 depicts a side perspective view of the bi-folding wheelchair 10 in a partially collapsed position displaying the location of the right backrest locking assembly release ring 72 and the left backrest locking assembly release ring 74 of the back rest locking assembly 77. FIG. 4 depicts a similar view of the bi-folding wheelchair 10 in a partially collapsed position with the wheel assembly 92 exploded away from the right side frame member 12. By removing the wheel hubcaps 112 and pushing in the spring loaded ball detent ends 114 the axles 110 will slide out of the orifices 116 in the right and left sliding wheel and break mounting units 118. Hand break arms 124 and 126 actuate the breaking mechanism 122 that is attached to the break mounting unit 118 with a similar breaking mechanism 120 not visible on the opposite side. It must be noted that the wheel hubcaps 112 may be made of a rigid material to be removed prior to pushing the spring loaded ball detent end 114 for removing the wheel assembly 92, or the wheel hubcaps 112 may be made from a flexible material. When the wheel hub caps 112 are made of a flexible material they will be left in place where pressure will deform them enough that the spring loaded ball detent end 114 will be actuated through them.

Figure 5:
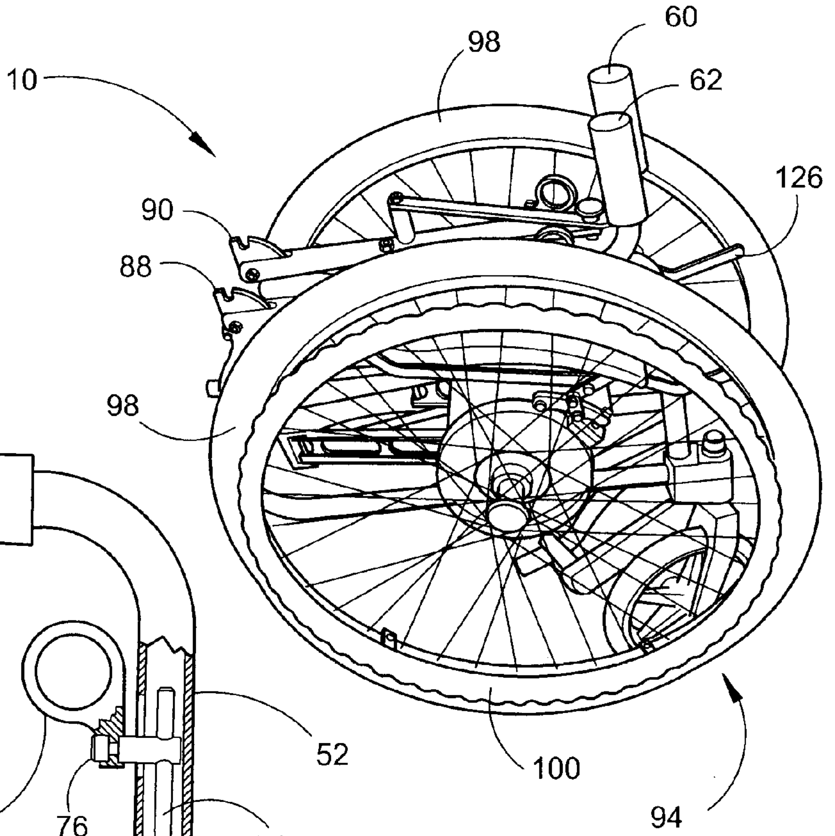
FIG. 5 depicts a side perspective view of the completely collapsed bi-folding wheelchair, constructed in accordance with the present invention.

FIG. 5 depicts a side perspective view of the completely collapsed bi-folding wheelchair 10. This view illustrates the fact that the device is narrower than in the expanded condition and almost all the mechanisms fall within the diameter of the wheels 96, with only a portion of the backrest locking mechanism 77 exposed. The hand grips 60 and 62 do extend and are used for rolling and manipulating the device when it is in the collapsed state.

Figure 6:
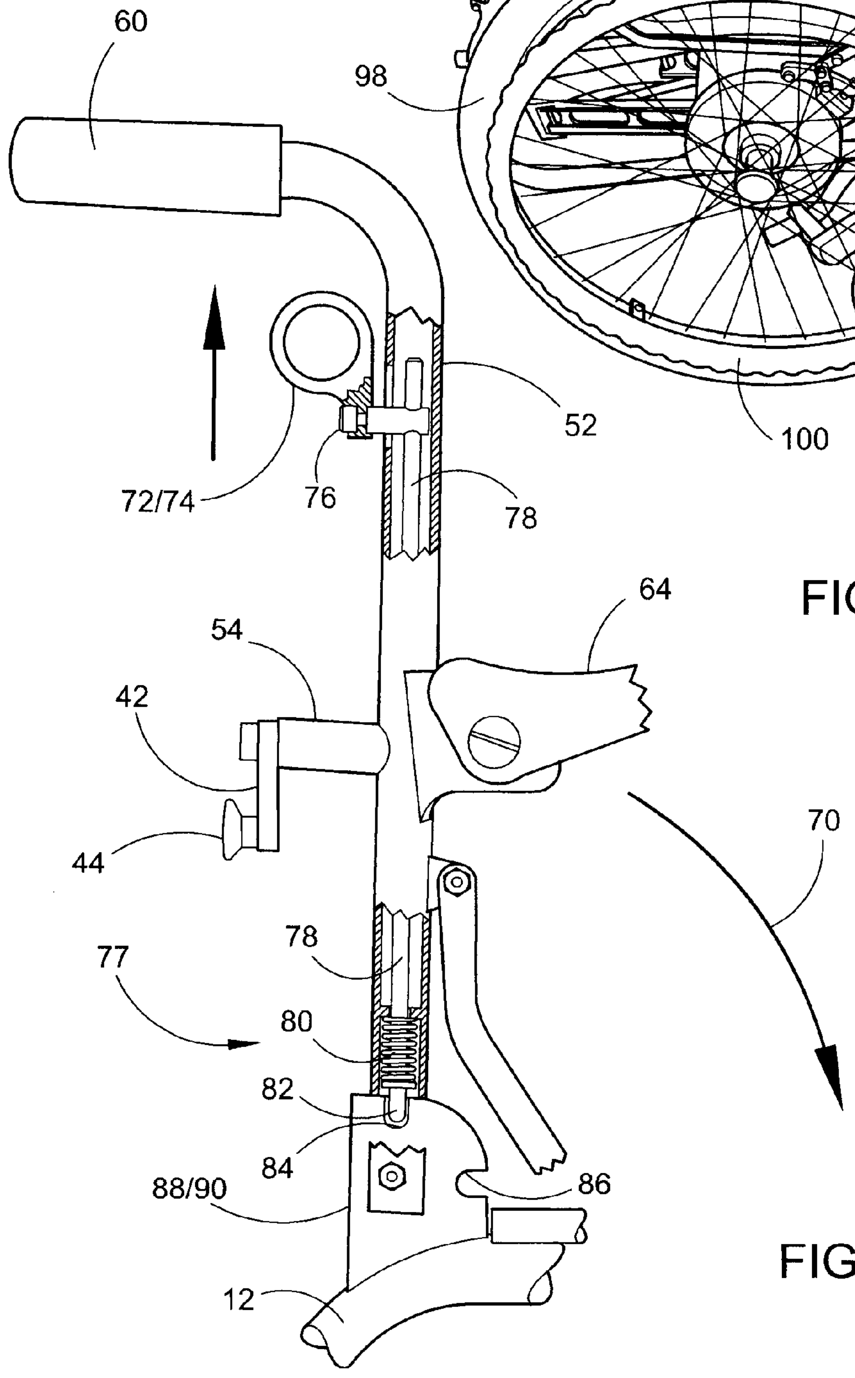
FIG. 6 depicts a side view of the spring-loaded locking mechanism located within the backrest support bars, constructed in accordance with the present invention.

FIG. 6 shows right side view of the backrest locking assembly 77 with the left side being symmetrical. This view with areas broken away shows the mechanism located within the backrest support bar 52. Release rings 72 and 74 are held in place by the means of the screws 76 attached to the spring loaded locking rods 78. The springs 80 on the spring-loaded locking rods 78 maintains pressure on the spring-loaded locking rod tips 82 within the upright orifices 84 holding the backrest in the upright position. The upright locking orifices 84 and the collapsed locking orifices 86 are an integral part of the right and left locking plates 88 and 90 that are welded on the right and left frame members 12 and 14. Directional arrow 70 indicates the direction that the backrest support bar 52 will rotate when the device is collapsed. A portion of the armrest 64 is shown attached to the backrest support bar 52.

Figure 7:
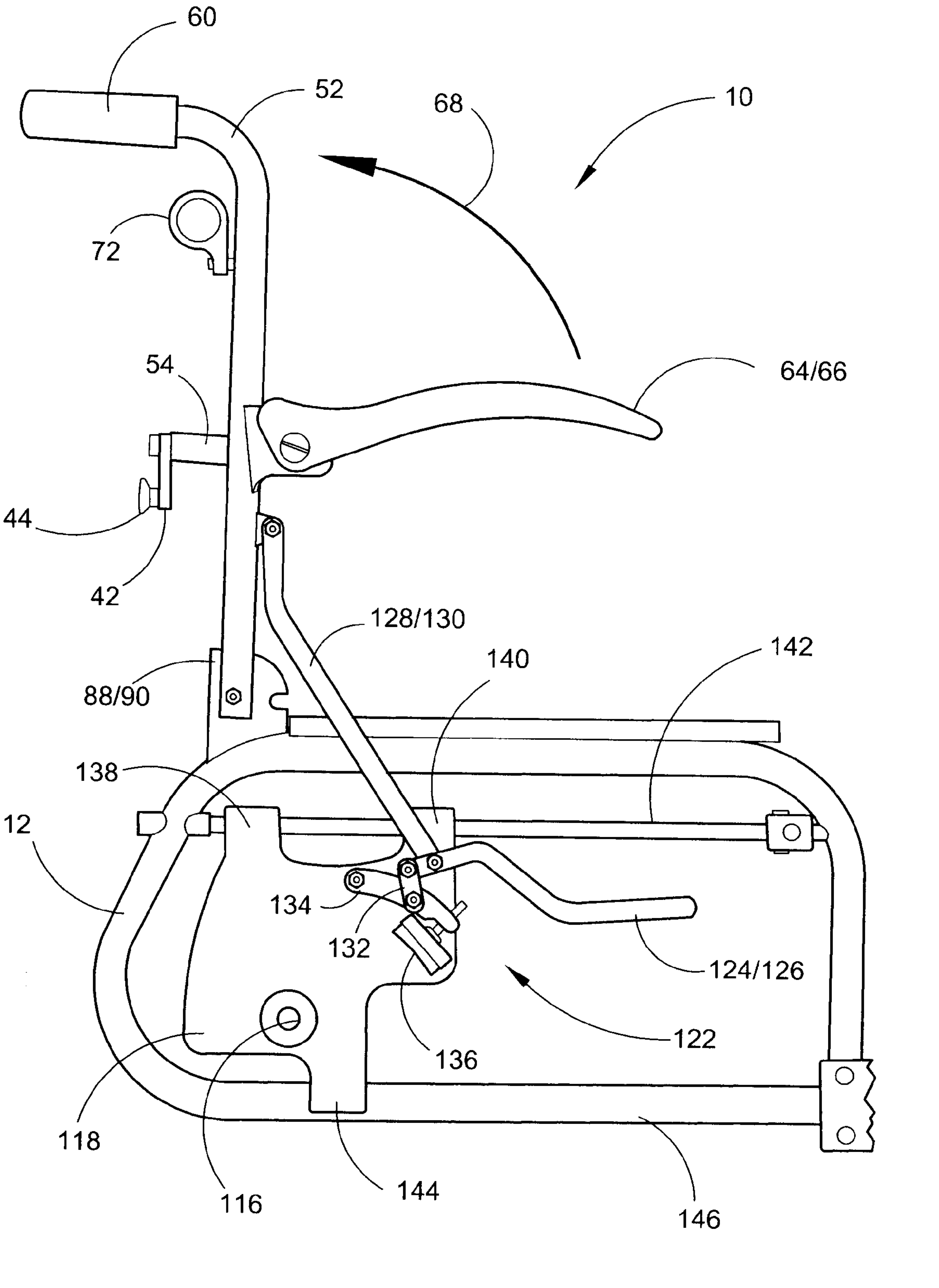
FIG. 7 depicts a side view of the bi-folding wheelchair frame in the upright position with the large rear wheel having the circular grip ring removed and the front caster wheels broken away displaying the sliding support mechanism and the breaking lever arm, constructed in accordance with the present invention.

FIG. 7 depicts a right side view of the bi-folding wheelchair 10 with the back rest support bar 52 in the upright position, and with the large rear wheel 96 and the circular handgrip ring 100 removed, and the swivel caster 16 broken away displaying the sliding support mechanism 118 and the breaking mechanism 122. The breaking mechanisms 122 consist of the handbrake arms 124 and 126 that are attached to the break lever arms 128 and 130 and the break actuator arms 132 that are attached to the break mounting arms 134 operating the break shoes 136. The armrests 64 and 66 are pivoted upwardly depicted by the rotational arrow 68 when the backrest support bars 52 and 56 are pivoted downwardly depicted by the rotational arrow 70 for storing the device The right and left sliding wheel and break mounting unit 118 facilitate the collapsibility of the device illustrated in the upright state in FIG. 7 and in the collapsed state in FIG. 8. These figures show the right side only, with the right and left sides being symmetrical. The device collapses in the direction indicated by the direction arrows 68 and 78 by the means of the rear sliding member 138 and the front sliding member 140 of the sliding wheel and break mounting unit 118 sliding on the upper horizontal slide rod 142. The lower portion of the sliding wheel and break mounting unit 118 is guided by the lower sliding member 144 that slides along the lower horizontal rail 146 of the frame member 12.

Figure 8:
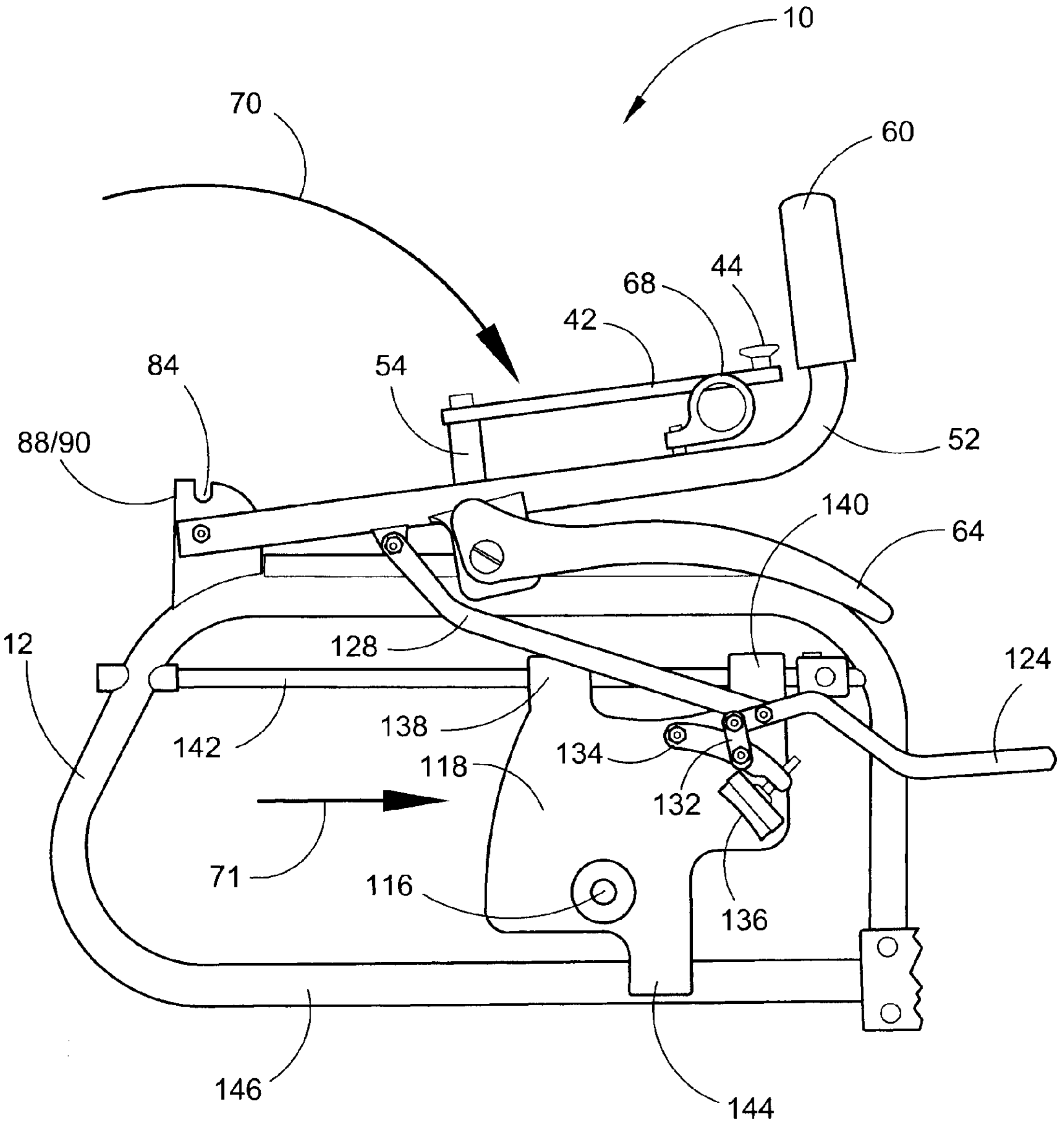
FIG. 8 depicts a side view of the bi-folding wheelchair in the folded position with the large rear wheel with the circular grip ring removed and the front caster wheels broken away.

FIG. 8 depicts a side view of the bi-folding wheelchair 10 in the folded position with the large rear wheel 96 and the circular grip ring 100 removed, and the front caster wheels 16 and 18 broken away. Directional arrow 71 indicates the direction that the sliding wheel and break mounting unit 118 moves to achieve the collapsed state and where the wheel 96 is also centrally located on the frame member 12.

The bi-folding wheelchair 10 shown in the drawings and described in detail herein disclose arrangements of elements of particular construction and configuration for illustrating preferred embodiments of structure and method of operation of the present invention. It is to be understood, however, that elements of different construction and configuration and other arrangements thereof, other than those illustrated and described may be employed for providing a bi-folding wheelchair 10 in accordance with the spirit of this invention, and such changes, alternations and modifications as would occur to those skilled in the art are considered to be within the scope of this invention as broadly defined in the appended claims.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

I claim:

1. A bi-folding wheelchair comprising:

(a) a left side wheel frame assembly and a right side wheel frame assembly, each supporting a wheel assembly, interconnected by a plurality of pivot arms and actuating arms, and having spanning there between a seat portion and a backrest portion;

(b) one or more locking arms foldably extending between said right frame member and said left frame member enabling said bi-folding wheelchair to lock securely in the open position for use, and unlock to be folded;

(c) a front over center locking mechanism further comprising a right side looking arm, a left side locking arm, a hand knob and a stop pin;

(d) a back over center locking mechanism further comprising a right side locking arm, a left side locking arm, a hand knob and a stop pin;

(e) one or more backrest locking assemblies integral to said left and right wheel frame assemblies enabling said backrest portion of said bi-folding wheelchair to lock securely in the open position for use, and unlock to be folded; and further wherein said backrest locking assemblies comprise right and left locking plates having upright locking orifices and collapsed locking orifices integrated therein, and release rings enabling manual locking and unlocking of the backrest locking assemblies;

whereby when in the open position for use said bi-folding wheelchair is secure from accidental collapse and when in the folded position is compressed into a compact space-saving, readily lifted and transportable configuration.

2. The bi-folding Wheelchair according to claim 1, wherein said wheel assemblies are quickly and easily removable.

3. The bi-folding wheelchair according to claim 2, wherein said wheel assemblies further comprise wheel mounts having spring loaded ball detents for quick release and removal.

4. The bi-folding wheelchair according to claim 3, wherein said wheel assemblies further include hub caps made of flexible material to allow pushing said spring loaded ball detents with said hub cap in place on said wheel assemblies.

5. The bi-folding wheelchair according to claim 1, further comprising armrests which fold upwardly to enable a compact folded configuration.

6. The bi-folding wheelchair according to claim 1, further comprising footrests which fold upwardly to enable a compact folded configuration.

7. The bi-folding wheelchair according to claim 1, wherein said one or more backrest locking assemblies integral to said left and right wheel frame assemblies are spring actuated and locked and unlocked using release rings.

8. The bi-folding wheelchair according to claim 1, wherein said backrest locking assemblies are further comprised of hollow backrest support bars housing therein spring loaded locking rods whereby the springs in said spring loaded locking bars maintain pressure on the tips of said spring loaded locking rods thereby holding the backrest locked in an upright position.

9. The bi-folding wheelchair according to claim 1, wherein said wheel frame assemblies include a break mechanism for the purpose of breaking the wheel and slowing stopping the bi-folding wheelchair.

10. The bi-folding wheelchair according to claim 9, wherein said break mechanism further includes a break mounting unit and said break mounting unit additionally acts to facilitate the collapsing of the bi-folding wheelchair.

11. A method for making a bi-folding wheelchair comprising the steps of:

(a) providing a left side wheel frame assembly and a right side wheel frame assembly, each supporting a wheel, interconnected by a plurality of pivot arms and actuating arms, and having spanning there between a seat portion and a backrest portion;

(b) providing one or more locking arms foldably extending between said right frame member and said left frame member enabling said bi-folding wheelchair to lock securely in the open position for use, and unlock to be folded;

(c) providing a front over center locking mechanism further comprising a right side locking arm, a left side locking arm, a hand knob and a stop pin;

(d) providing a hack over center locking mechanism further comprising a right side locking arm, a left side locking arm, a hand knob and a stop pin;

(e) providing one or more backrest locking assemblies integral to said left and right wheel frame assemblies enabling said backrest portion of said bi-folding wheelchair to lick securely in the open position for use, and unlock to be folded; and further wherein said backrest locking assemblies comprise right and left locking plates having upright locking orifices and collapsed locking orifices integrated therein, and release rings enabling manual locking and unlocking of the backrest locking assemblies;

whereby when in the open position for use said bi-folding wheelchair is secure from accidental collapse and when in the folded position is compressed into a compact space-saving, readily lifted and transportable configuration.

12. The method for making as bi-folding wheelchair according to claim 11, wherein said step of providing wheel frame assemblies includes the step of providing wheel frame assemblies having wheel assemblies capable of being quickly and easily removed.

13. The method for making as bi-folding wheelchair according to claim 12, wherein said step of providing wheel frame assemblies having wheel assemblies capable of being quickly and easily removed further includes the step of providing wheel assemblies with wheel mounts having spring loaded ball detents for quick release and removal.

14. The method for making a bi-folding wheelchair according to claim 12, wherein said step of providing wheel frame assemblies having wheel assemblies capable of being quickly and easily removed further includes the step of providing further includes the step of providing said wheel assemblies having hub caps made of flexible material to allow pushing said spring loaded ball detents with said hub cap in place on said wheel assemblies.

15. The method for making a bi-folding wheelchair according to claim 11, wherein said step of providing wheel frame assemblies includes the step of providing armrests which fold upwardly to enable a compact folded configuration.

16. The method for making a bi-folding wheelchair according to claim 11, wherein said step of providing wheel frame assemblies includes the step of providing footrests which fold upwardly to enable a compact folded configuration.

17. The method for making a bi-folding wheelchair according to claim 11, wherein said step of providing one or more backrest locking assemblies integral to said left and right wheel frame assemblies further includes the step of providing one or more backrest locking assemblies integral to said left and right wheel frame assemblies that are spring actuated and locked and unlocked using release rings.

18. The method for making a bi-folding wheelchair according to claim 11, wherein said step of providing one or more backrest locking assemblies integral to said left and right wheel frame assemblies further includes the step of providing backrest locking assemblies that are further comprised, of hollow backrest support bars housing therein spring loaded locking rods whereby the springs in said spring loaded locking bars maintain pressure on the tips of said spring loaded locking rods thereby holding the backrest locked in an upright position.

19. The method for making a bi-folding wheelchair according to claim 11, wherein said step of providing a left side wheel frame assembly and a right side wheel frame assembly further includes the step of providing said wheel frame assemblies that include a break mechanism for the purpose of breaking the wheel and slowing or stopping the bi-folding wheelchair.

20. The method for making a bi-folding wheelchair according to claim 19, wherein said step of providing said wheel frame assemblies that include a break mechanism for the purpose of breaking the wheel and slowing or stopping the bi-folding wheelchair further includes the step of providing said break mechanism that further includes a break mounting unit, and said break mounting unit additionally acts to facilitate the collapsing of the bi-folding wheelchair.

* * * * *